(12) United States Patent
Nishiyama et al.

(10) Patent No.: US 11,664,672 B2
(45) Date of Patent: May 30, 2023

(54) CHARGING CONTROLLER

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 16/897,622

(22) Filed: Jun. 10, 2020

(65) Prior Publication Data

US 2021/0013728 A1 Jan. 14, 2021

(30) Foreign Application Priority Data

Jul. 9, 2019 (JP) .............................. JP2019-127878

(51) Int. Cl.
| | | |
|---|---|---|
| *H02J 7/00* | (2006.01) | |
| *H02J 7/14* | (2006.01) | |
| *H01R 13/66* | (2006.01) | |
| *B60L 53/16* | (2019.01) | |
| *B60L 58/27* | (2019.01) | |
| *B60L 58/12* | (2019.01) | |
| *B60L 53/60* | (2019.01) | |
| *B60L 53/18* | (2019.01) | |

(52) U.S. Cl.
CPC ............ *H02J 7/0071* (2020.01); *B60L 53/16* (2019.02); *B60L 53/18* (2019.02); *B60L 53/60* (2019.02); *B60L 58/12* (2019.02); *B60L 58/27* (2019.02); *H01R 13/6683* (2013.01); *H02J 7/0045* (2013.01); *H02J 7/007192* (2020.01); *B60L 2240/545* (2013.01); *H01R 2201/26* (2013.01)

(58) Field of Classification Search
CPC ... H02J 7/0071; H02J 7/007192; B60L 53/60; B60L 53/16; B60L 53/18; B60L 58/27; B60L 58/12
USPC .......................................................... 320/109
See application file for complete search history.

(56) References Cited

U.S. PATENT DOCUMENTS

| | | | |
|---|---|---|---|
| 2004/0155661 A1* | 8/2004 | Field .................. | B60L 58/15 |
| | | | 324/426 |
| 2005/0099154 A1* | 5/2005 | Ohnuma .............. | B60L 3/0046 |
| | | | 320/107 |
| 2010/0097036 A1 | 4/2010 | Wakayama | |

(Continued)

FOREIGN PATENT DOCUMENTS

| | | |
|---|---|---|
| JP | 2010-098897 A | 4/2010 |
| JP | 2013-081324 A | 5/2013 |

(Continued)

*Primary Examiner* — Alexis B Pacheco
(74) *Attorney, Agent, or Firm* — Dinsmore & Shohl LLP

(57) ABSTRACT

Provided is a charging controller that controls a process of charging a battery from an external power source. When an outside air temperature is equal to or lower than a predetermined temperature, the charging controller charges the battery from a time earlier than a scheduled time of use of the battery by a predetermined time until the scheduled time of use. Thus, even when the outside air temperature is equal to or lower than the predetermined temperature, the temperature of the battery has been raised by heat generated during the charging by the time of use of the battery.

2 Claims, 7 Drawing Sheets

(56) References Cited

U.S. PATENT DOCUMENTS

| | | | |
|---|---|---|---|
| 2010/0156352 A1* | 6/2010 | Muta | B60L 50/16 180/65.21 |
| 2010/0292855 A1* | 11/2010 | Kintner-Meyer | B60L 53/14 700/36 |
| 2011/0202221 A1* | 8/2011 | Sobue | B60L 8/003 701/22 |
| 2013/0088198 A1 | 4/2013 | Masuda | |
| 2013/0204456 A1* | 8/2013 | Tippelhofer | B60L 53/00 701/1 |
| 2014/0006137 A1* | 1/2014 | Melen | B60L 53/63 705/14.35 |
| 2014/0217976 A1* | 8/2014 | McGrath | B60L 53/00 320/109 |
| 2021/0053457 A1* | 2/2021 | Jeon | H02J 7/007192 |
| 2021/0339647 A1* | 11/2021 | Batir | B60L 53/68 |
| 2022/0032809 A1* | 2/2022 | Lu | B60L 53/665 |

FOREIGN PATENT DOCUMENTS

| | | |
|---|---|---|
| JP | 2013-121304 A | 6/2013 |
| JP | 2014-166051 A | 9/2014 |
| JP | 2016-088252 A | 5/2016 |
| JP | 2016-167420 A | 9/2016 |
| WO | 2014132112 A2 | 9/2014 |

\* cited by examiner

CHARGING CONTROLLER

CROSS-REFERENCE TO RELATED APPLICATIONS

This application claims priority to Japanese Patent Application No. 2019-127878 filed on Jul. 9, 2019, which is incorporated herein by reference in its entirety including the specification, drawings and abstract.

BACKGROUND

1. Technical Field

The disclosure relates to a charging controller that controls a process of charging a battery.

2. Description of Related Art

Japanese Patent No. 6515489 (Japanese Patent Application Publication No. 2016-088252 (JP 2016-088252 A)) describes a structure including: a recess which is formed in an outer surface of a body of a vehicle and has an opening in the outer surface of the vehicle body and in which at least one of a fuel filler opening and a charging inlet is disposed; a lid that opens and closes the opening; and covers that cover at least either an upper side or lateral sides between the opening and the lid when the lid is opened, and that have a heater that generates heat as a current is applied thereto from a power source installed in the vehicle.

SUMMARY

In the case of Japanese Patent No. 6515489 (JP 2016-088252 A), if the battery installed in the vehicle is charged, for example, during a winter night, so as to reach a full state-of-charge at a time earlier than a scheduled time of use of the battery accompanying the use of the vehicle, it is likely that the temperature of the battery will have become low and degraded the charging-discharging performance thereof by the scheduled time of use.

Further, in the case of Japanese Patent No. 6515489 (JP 2016-088252 A), when an outside air temperature is equal to or lower than a predetermined temperature, it is likely that the covers will freeze during a period from the end of a charging process until starting the vehicle, making it impossible to remove a charging gun inserted into the charging inlet from the charging inlet when starting the vehicle.

An object of the disclosure is to provide a charging controller that, when an outside air temperature is equal to or lower than a predetermined temperature, allows the charging-discharging performance of a battery to be in as enhanced a state as possible at the time of use of the battery.

The disclosure is a charging controller that controls a process of charging a battery from an external power source. When an outside air temperature is equal to or lower than a predetermined temperature, the charging controller charges the battery from a time earlier than a scheduled time of use of the battery by a predetermined time until the scheduled time of use.

In this configuration, when an outside air temperature is equal to or lower than a predetermined temperature, the battery is charged until the scheduled time of use of the battery. Thus, the temperature of the battery has been raised by heat generated during the charging by the time of use of the battery.

Therefore, even when an outside air temperature is equal to or lower than a predetermined temperature, the charging-discharging performance of the battery can be in as enhanced a state as possible at the time of use of the battery.

The above charging controller may include: an outside air temperature determining unit that determines whether or not an outside air temperature is equal to or lower than a predetermined temperature; a scheduled-time-of-use determining unit that, when the outside air temperature determining unit determines that the outside air temperature is equal to or lower than the predetermined temperature, determines whether or not the scheduled time of use is ascertainable or inferable; an early-stage charging processing unit that, when the scheduled-time-of-use determining unit determines that the scheduled time of use is ascertainable or inferable, charges the battery so as to reach a predetermined state-of-charge lower than a full state-of-charge; and a late-stage charging processing unit that, after execution of an early-stage charging process, charges the battery so as to reach the full state-of-charge from a time earlier than the scheduled time of use by a predetermined time until the scheduled time of use.

In this configuration, the conditions for executing the charging and the control logic relating to the charging are specified in detail.

In particular, since the charging is divided into an early stage and a late stage, it is possible to raise the temperature of the battery by heat generated during the charging while ensuring that the battery reaches the full state-of-charge by the scheduled time of use.

The above charging controller may be provided in an outlet cable having a charging connector that is removably connected to a charging inlet of the battery and a power plug that is removably connected to a power socket of the external power source.

In this configuration, when an outside air temperature is equal to or lower than a predetermined temperature, not only the temperature of the battery but also the temperatures of the charging inlet of the battery and the charging connector of the outlet cable have been raised by heat generated during the charging by the time of use of the battery.

Thus, even when an outside air temperature is equal to or lower than a predetermined temperature, the charging-discharging performance of the battery can be in as enhanced a state as possible at the time of use of the battery. Moreover, a troublesome situation where the charging inlet of the battery and the charging connector freeze in a state of being connected to each other can be avoided, so that the trouble of melting the frozen charging inlet and charging connector when the battery is used can be eliminated.

Therefore, when used to charge a battery installed in an electrically powered vehicle, the charging controller of the disclosure can contribute to increasing the usability of the electrically powered vehicle.

The above charging controller may include: a connection determining unit that determines whether or not the battery and the external power source are connected to each other by the outlet cable; an outside air temperature determining unit that, when the connection determining unit determines that the battery and the external power source are connected to each other, determines whether or not an outside air temperature is equal to or lower than a predetermined temperature; a scheduled-time-of-use determining unit that, when the outside air temperature determining unit determines that the outside air temperature is equal to or lower than the predetermined temperature, determines whether or not the scheduled time of use is ascertainable or inferable; an early-stage charging processing unit that, when the scheduled-time-of-use determining unit determines that the scheduled time of use is ascertainable or inferable, charges the battery so as to reach a predetermined state-of-charge lower than a full state-of-charge; and a late-stage charging processing unit that, after execution of an early-stage charging process, charges the battery so as to reach the full state-of-charge from a time earlier than the scheduled time of use by a predetermined time until the scheduled time of use.

In this configuration, the conditions for executing the charging and the control logic relating to the charging are specified in detail. In particular, since the conditions for executing the charging include a condition that preparation for charging the battery is made, the charging can be reliably executed.

Moreover, since the charging is divided into an early stage and a late stage, it is possible to raise the temperature of the battery as well as the temperatures of the charging inlet of the battery and the charging connector by heat generated during the charging, while ensuring that the battery reaches the full state-of-charge by the scheduled time of use.

Thus, even when an outside air temperature is equal to or lower than a predetermined temperature, the charging-discharging performance of the battery can be in as enhanced a state as possible at the time of use of the battery. Moreover, a troublesome situation where the charging inlet of the battery and the charging connector freeze in a state of being connected to each other can be avoided, so that the trouble of melting the frozen charging inlet and charging connector when the battery is used can be eliminated.

Therefore, when used to charge a battery installed in an electrically powered vehicle, the charging controller of the disclosure can contribute to increasing the usability of the electrically powered vehicle.

The disclosure can provide a charging controller that, when an outside air temperature is equal to or lower than a predetermined temperature, allows the charging-discharging performance of a battery to be in as enhanced a state as possible at the time of use of the battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
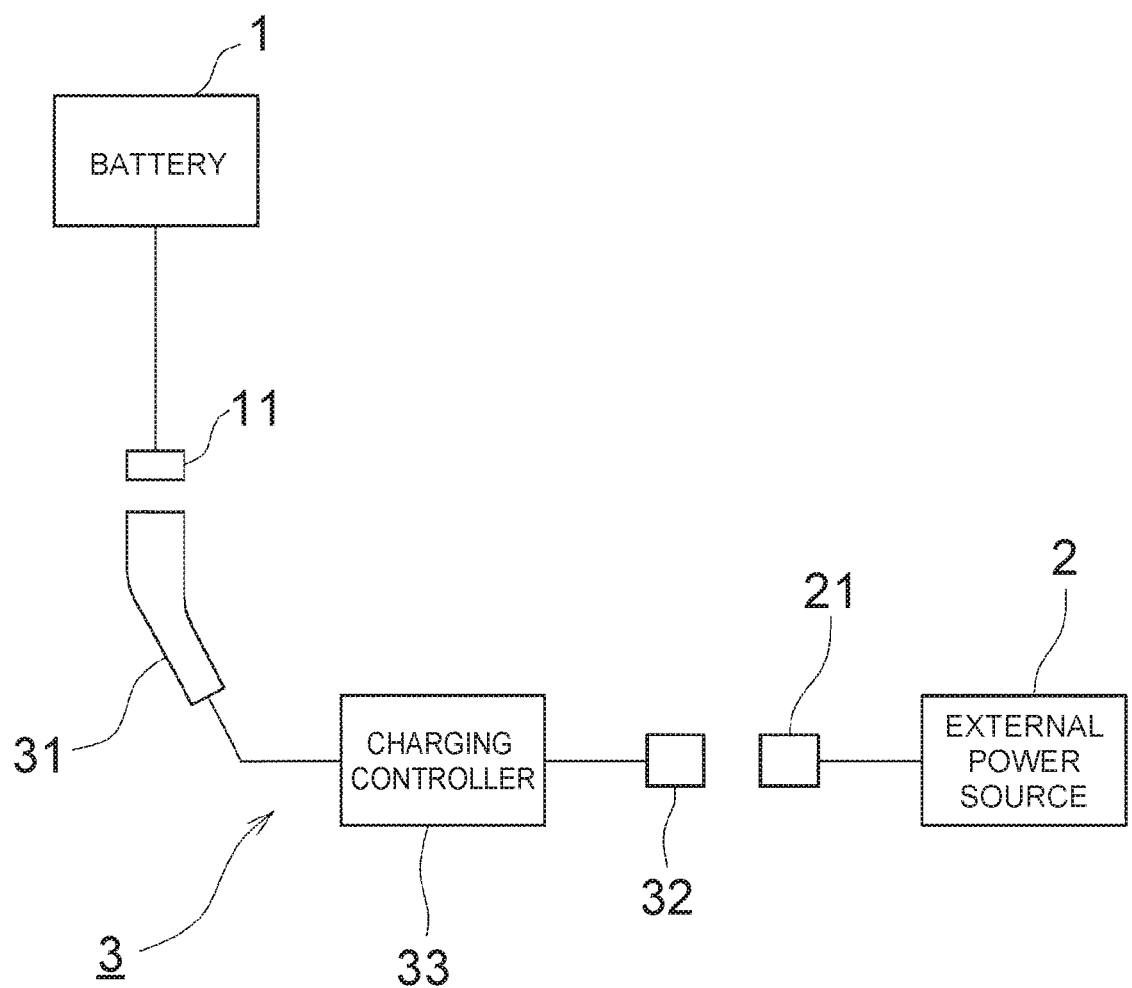
FIG. 1 is a view showing a schematic configuration of one embodiment of a charging controller according to the disclosure.

The best mode for carrying out the disclosure will be described in detail below with reference to the accompanying drawings.

FIG. 1 to FIG. 4 show one embodiment of the disclosure. In the drawings, reference signs 1, 2, and 3 denote a battery, an external power source, and an outlet cable, respectively.

The battery 1 is installed, for example, in an electrically powered vehicle. Examples of the electrically powered vehicle include an electric vehicle that generates travel driving force by a motor alone, and a plug-in hybrid vehicle that generates travel driving force by at least one of an engine and a motor.

In such an electrically powered vehicle, it is possible to charge the battery 1 for traveling installed therein with electricity from the external power source 2.

The external power source 2, which is also called a charging facility, can be installed, for example, in or around the house of a user of the electrically powered vehicle.

The battery 1 is provided with a charging inlet 11. The external power source 2 is provided with a power socket 21.

Figure 2:
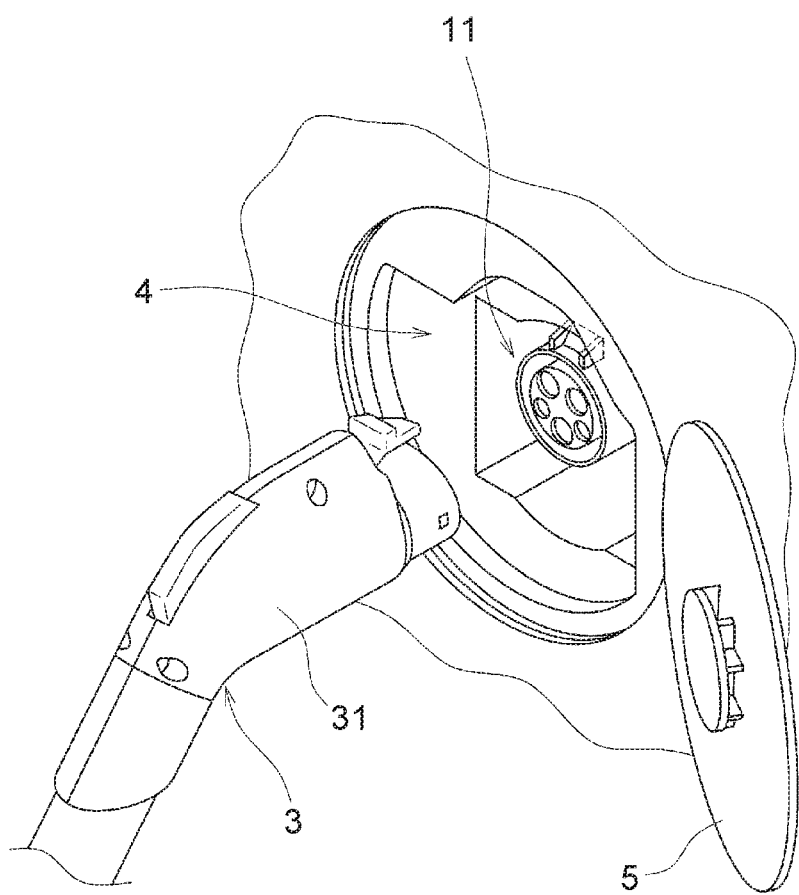
FIG. 2 is a perspective view showing a charging inlet of a battery and a charging connector of an outlet cable.

For example, as shown in FIG. 2, the charging inlet 11 is provided inside a recess 4 in a side surface of a vehicle body of the electrically powered vehicle, and a lid 5 that can hide or expose the charging inlet 11 is provided in an opening of the recess 4.

The outlet cable 3 electrically connects the battery 1 and the external power source 2 to each other, and is configured to be independently carriable in this embodiment.

The outlet cable 3 has a charging connector 31, a power plug 32, and a charging controller 33.

The charging connector 31 is removably coupled and electrically connected to the charging inlet 11 of the battery 1.

The power plug 32 is removably coupled and electrically connected to the power socket 21 of the external power source 2.

The charging controller 33 controls a process of charging the battery 1 from the external power source 2.

Although this is not shown in detail, the charging controller 33 is a commonly known electronic control unit (ECU), and includes a central processing unit (CPU), a non-volatile storage device (read-only memory (ROM)), a temporary storage device (random-access memory (RAM)), and others.

The ROM stores various control programs, maps that are referred to when executing the various control programs, etc. The CPU executes computation processes based on the various control programs and the maps stored in the ROM. The RAM is a memory that temporarily stores calculation results of the CPU, data input from sensors, etc.

If the battery 1 installed in the electrically powered vehicle is charged, for example, during a winter night, with the charging connector 31 of the outlet cable 3 connected to the charging inlet 11 of the battery 1, so as to reach a full state-of-charge at a time earlier than a scheduled time of use of the battery 1 accompanying the use of the electrically powered vehicle, it is likely that the temperature of the battery 1 will have become low and degraded the charging-discharging performance thereof by the scheduled time of use, and that the charging connector 31 and the charging inlet 11 will freeze in a state of being connected to each other, making it impossible to remove the charging connector 31 from the charging inlet 11 when the electrically powered vehicle is used.

The scheduled time of use is, in other words, a scheduled time of starting to drive the electrically powered vehicle.

In view of such a situation, when an outside air temperature is equal to or lower than a predetermined temperature (e.g., a temperature at which freezing can occur), the charging controller 33 performs a special charging process that effectively uses heat generated during charging in order to avoid degradation of the charging-discharging performance of the battery 1 and freezing of the charging inlet 11 of the battery 1 and the charging connector 31 connected thereto.

Figure 4:
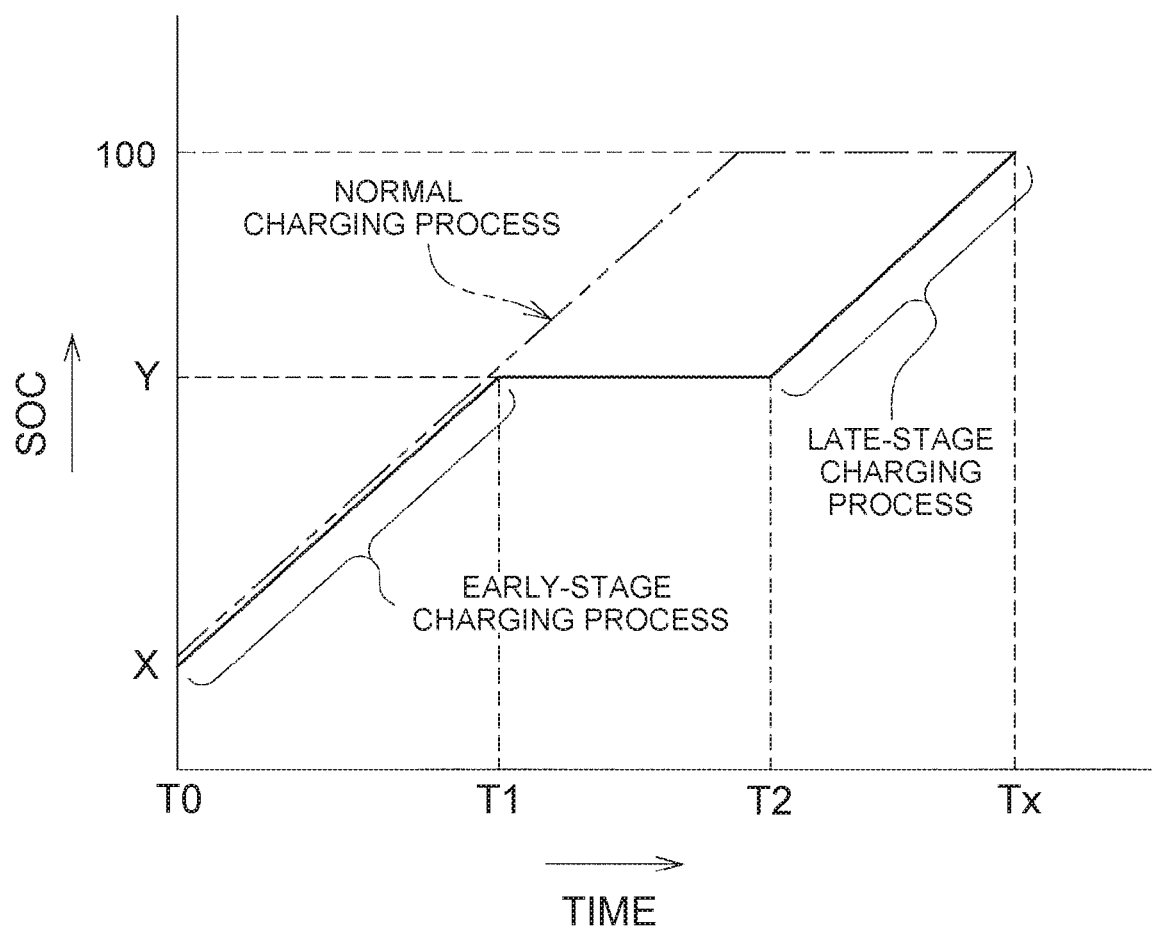
FIG. 4 is a view showing a graph illustrating a special charging process and a normal charging process in FIG. 3.

This special charging process includes an early-stage charging process and a late-stage charging process, for example, as indicated by the solid line in FIG. 4.

The early-stage charging process refers to a process of charging the battery 1 so as to reach a predetermined state-of-charge Y, lower than a full state-of-charge (100%), from a current state-of-charge X, during a period from a point (start time T0) when predetermined conditions (steps S1, S2, and S4 of FIG. 3 etc.) are met until a time earlier than a scheduled time of use Tx by a predetermined time (until an end time T1).

The late-stage charging process refers to a process of charging the battery 1 so as to reach the full state-of-charge (100%) from the predetermined state-of-charge Y that has been reached by the early-stage charging process, during a period from a time earlier than the scheduled time of use Tx of the battery 1 by a predetermined time (from a start time T2) until the scheduled time of use Tx (end time).

When setting the execution time of the late-stage charging process, it is necessary to take into account that heat should be generated by the late-stage charging process that can raise the temperatures of the battery 1, the charging inlet 11, and the charging connector 31 to predetermined temperatures.

The scheduled time of use Tx is ascertained or inferred based on an ascertaining method or an inferring method described below.

For example, in a case where an occupant can manually input the scheduled time of use Tx into the charging controller 33 in advance, it is possible to ascertain the scheduled time of use Tx by checking the scheduled time of use Tx input into an internal memory etc. of the charging controller 33.

In another possible method, the charging controller 33 and a controller (not shown) of the electrically powered vehicle can communicate with each other, and history information showing past scheduled times of use of the electrically powered vehicle is stored in the controller (not shown) of the electrically powered vehicle. When the charging connector 31 is connected to the charging inlet 11 of the battery 1, the charging controller 33 reads out the history information from the controller (not shown) of the electrically powered vehicle, calculates an average value of the past scheduled times of use of the electrically powered vehicle based on the history information, and infers the scheduled time of use Tx based on the calculation result.

The end time T1 of the early-stage charging process is appropriately set, for example, with the scheduled time of use Tx, the time taken to charge to the predetermined state-of-charge Y, and the time taken to complete the late-stage charging process taken into account.

The start time T2 of the late-stage charging process is appropriately set with securing the time taken to complete the late-stage charging process taken into account.

When an outside air temperature is higher than a predetermined temperature, the charging controller 33 performs a normal charging process.

For example, as indicated by the long dashed-double short dashed line in FIG. 4, the normal charging process is a process in which charging is started, for example, at a point when an outside air temperature is detected to be higher than a predetermined temperature (a point when a No determination is made in step S2 of FIG. 3), regardless of the scheduled time of use Tx of the electrically powered vehicle, and the battery is charged to reach the full state-of-charge at a constant charging capacity so as to quickly complete the charging process before the scheduled time of use Tx.

To detect the outside air temperature, for example, an outside air temperature sensor (not shown) may be installed in the outlet cable 3, and the charging controller 33 may detect the outside air temperature based on an output of this outside air temperature sensor.

In another possible method, the charging controller 33 and the controller (not shown) of the electrically powered vehicle can communicate with each other, and an outside air temperature sensor (not shown) is installed in the electrically powered vehicle, or the electrically powered vehicle can acquire weather information from a cloud or the like. When the charging connector 31 of the outlet cable 3 is connected to the charging inlet 11 of the battery 1, the charging controller 33 detects the outside air temperature based on the outside air temperature sensor or the weather information.

A procedure of control by the charging controller 33 will be specifically described with reference to the flowchart shown in FIG. 3.

Figure 3:
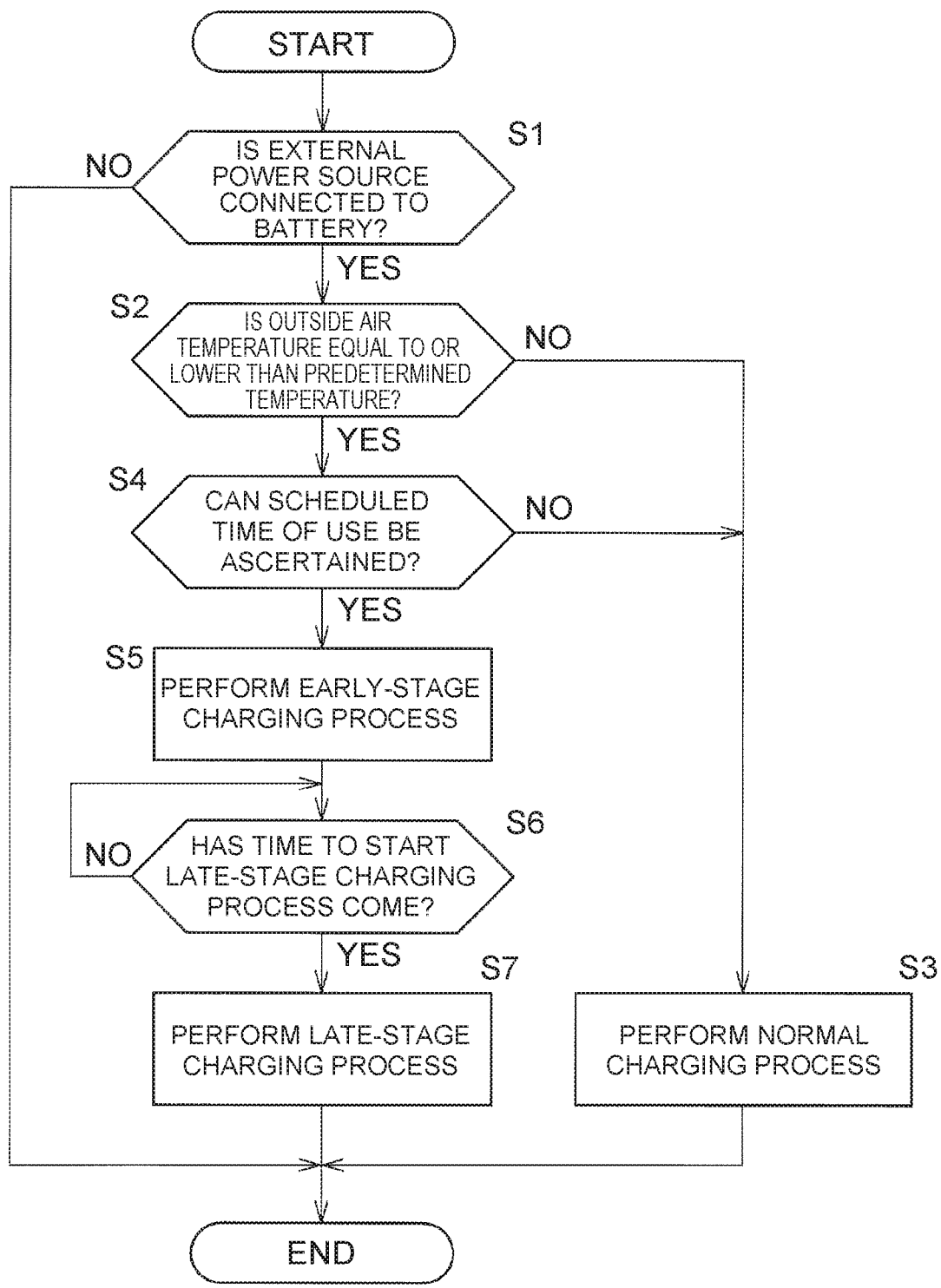
FIG. 3 is a view showing a flowchart illustrating a procedure of control by the charging controller of FIG. 1.

The process of the flowchart shown in FIG. 3 is started in regular cycles. In step S1, it is determined whether or not the external power source 2 is connected to the battery 1 by the outlet cable 3. Here, it is checked whether or not the charging connector 31 of the outlet cable 3 is connected to the charging inlet 11 of the battery 1.

When it is determined in step S1 that the charging connector 31 is not connected, a No determination is made and the current process is ended.

On the other hand, when it is determined in step S1 that the charging connector 31 is connected, a Yes determination is made and the process moves to step S2.

In step S2, it is determined whether or not an outside air temperature is equal to or lower than a predetermined temperature (e.g., a temperature at which freezing can occur).

When it is determined in step S2 that the outside air temperature is higher than the predetermined temperature, a No determination is made and the process moves to step S3. In step S3, the normal charging process is performed and then the current process is ended.

On the other hand, when it is determined in step S2 that the outside air temperature is equal to or lower than the predetermined temperature, a Yes determination is made and the process moves to step S4.

In step S4, it is determined whether or not the scheduled time of use Tx of the battery 1, i.e., a time at which the electrically powered vehicle is scheduled to be driven next time, can be ascertained or inferred. In the case of this embodiment, the scheduled time of use Tx can be ascertained or inferred by the above-described ascertaining method or inferring method.

Here, when it is determined in step S4 that the scheduled time of use Tx cannot be ascertained or inferred, a No determination is made, and the normal charging process is performed in step S3, and then the current process is ended.

On the other hand, when it is determined in step S4 that the scheduled time of use Tx can be ascertained or inferred, a Yes determination is made and the special charging process shown in steps S5 to S7 is performed.

First, in step S5, the early-stage charging process is performed. After the early-stage charging process ends, it is determined in step S6 whether or not the time to start the late-stage charging process has come.

Here, when it is determined in step S6 that the time to start the late-stage charging process has not yet come, a No determination is made and the process of step S6 is performed again.

On the other hand, when it is determined in step S6 that the time to start the late-stage charging process has come, a Yes determination is made, and the late-stage charging process is performed in step S7, and then the current process is ended.

As has been described above, in the embodiment to which the disclosure is applied, when an outside air temperature is equal to or lower than a predetermined temperature, it is possible to raise the temperature of the battery 1 as well as the temperatures of the charging inlet 11 of the battery 1 and the charging connector 31 of the outlet cable 3 by heat generated during charging, while ensuring that the battery 1 is charged to reach the full state-of-charge by the scheduled time of use Tx.

Thus, even when an outside air temperature is equal to or lower than a predetermined temperature, the charging-discharging performance of the battery 1 can be in as enhanced a state as possible at the time of use Tx of the battery 1. Moreover, a troublesome situation where the charging inlet 11 of the battery 1 and the charging connector 31 of the outlet cable 3 freeze in a state of being connected to each other can be avoided, so that the trouble of melting the frozen charging inlet 11 and charging connector 31 when the battery 1 is used can be eliminated.

Therefore, when used to charge the battery 1 installed in an electrically powered vehicle, the charging controller 33 can contribute to increasing the usability of the electrically powered vehicle.

In particular, since the conditions for executing the special charging process include the condition that preparation for charging the battery 1 is made (a Yes determination in step S1) in the above embodiment, the special charging process can be reliably executed.

Step S1 corresponds to the connection determining unit described in claim 4. Step S2 corresponds to the outside air temperature determining unit described in claims 2 and 4. Step S4 corresponds to the scheduled-time-of-use determining unit described in claims 2 and 4. Step S5 corresponds to the early-stage charging processing unit described in claims 2 and 4. Steps S6 and S7 correspond to the late-stage charging processing unit described in claims 2 and 4.

The disclosure is not limited to the above embodiment and the modified examples but includes all changes and applications within the scope of the claims and an equivalent scope.

(1) In FIG. 3 presented in the above embodiment, step S1 can be omitted, and this case is also included in the disclosure.

Figure 6:
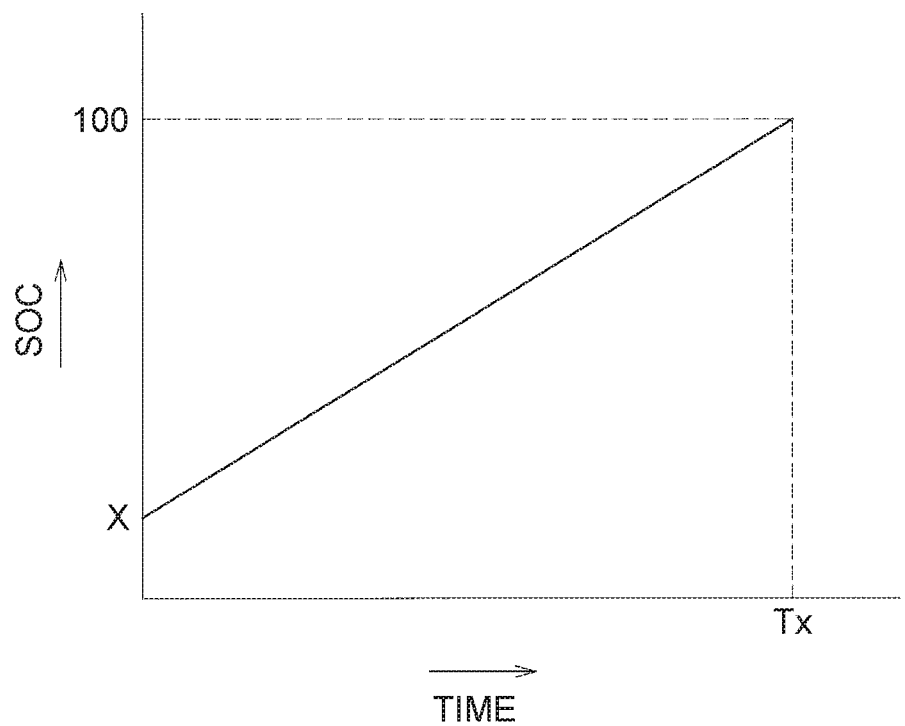
FIG. 6 is a view showing a graph illustrating a continuous charging process in FIG. 5.

(2) In the above embodiment, the example in which the special charging process is divided into an early stage and a late stage has been shown. However, the disclosure is not limited to this example. For example, as shown in FIG. 6, a continuous charging process of continuously performing the special charging process at a relatively slow rate can also be performed.

Another example of a procedure of control by the charging controller 33 will be specifically described with reference to the flowchart shown in FIG. 5.

Figure 5:
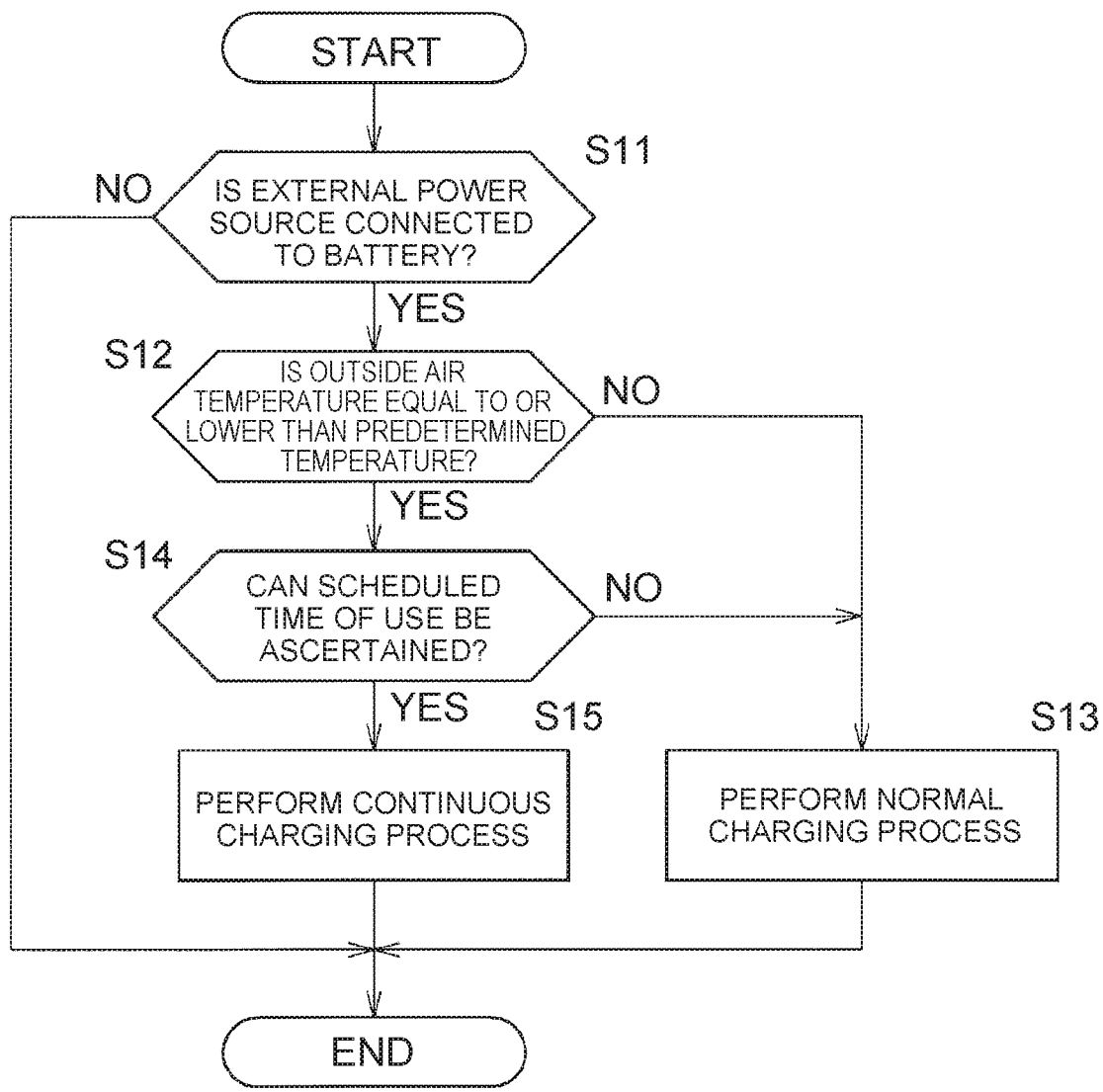
FIG. 5 is a view showing a flowchart illustrating a procedure of control in another embodiment of the charging controller according to the disclosure.

The process of the flowchart shown in FIG. 5 is started in regular cycles. In step S11, it is determined whether or not the external power source 2 is connected to the battery 1 by the outlet cable 3. Here, it is checked whether or not the charging connector 31 of the outlet cable 3 is connected to the charging inlet 11 of the battery 1.

When it is determined in step S11 that the charging connector 31 is not connected, a No determination is made and the current process is ended.

On the other hand, when it is determined in step S11 that the charging connector 31 is connected, a Yes determination is made and the process moves to step S12.

In step S12, it is determined whether or not an outside air temperature is equal to or lower than a predetermined temperature (e.g., a temperature at which freezing can occur).

When it is determined in step S12 that the outside air temperature is higher than the predetermined temperature, a No determination is made and the process moves to step S13. In step S13, the normal charging process is performed and then the current process is ended.

On the other hand, when it is determined in step S12 that the outside air temperature is equal to or lower than the predetermined temperature, a Yes determination is made and the process moves to step S14.

In step S14, it is determined whether or not the scheduled time of use Tx of the battery 1, i.e., a time at which the electrically powered vehicle is scheduled to be driven next time, can be ascertained or inferred. In the case of this embodiment, the scheduled time of use Tx can be ascertained or inferred by the above-described ascertaining method or inferring method.

Here, when it is determined in step S14 that the scheduled time of use Tx cannot be ascertained or inferred, a No determination is made, and the normal charging process is performed in step S13, and then the current process is ended.

On the other hand, when it is determined in step S14 that the scheduled time of use Tx can be ascertained or inferred, a Yes determination is made and the continuous charging process shown in step S15 is performed.

In step S15, the battery 1 is charged until reaching the full state-of-charge continuously at a relatively slow rate during a period from a point when a Yes determination is made in step S14 until the scheduled time of use Tx of the battery 1, and then the current process is ended.

This embodiment has effects and advantages similar to those of the above embodiment.

(3) In the above embodiment, the example in which charging is performed with the battery 1 and the external power source 2 connected to each other by the outlet cable 3 has been shown. However, the disclosure is not limited to this example. The disclosure can also be applied to a case where charging is performed, for example, with the battery 1 and the external power source 2 wirelessly connected to each other.

In this case, the charging controller 33 can be provided as a part separate from the outlet cable 3 and installed in the external power source 2 or in the electrically powered vehicle equipped with the battery 1.

Another example of a procedure of control by the charging controller 33 will be specifically described with reference to the flowchart shown in FIG. 7.

Figure 7:
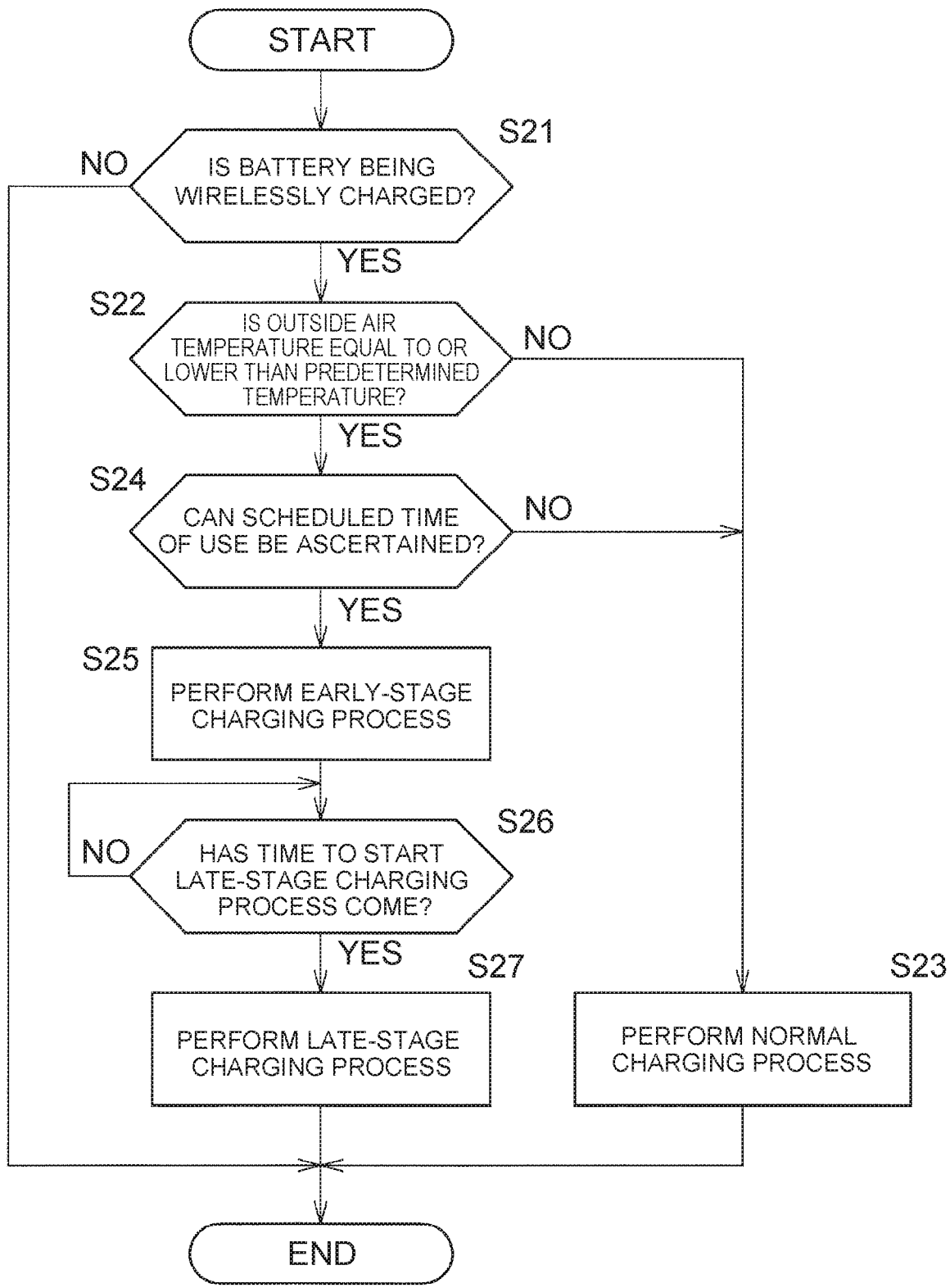
FIG. 7 is a view showing a flowchart illustrating a procedure of control in another embodiment of the charging controller according to the disclosure.

The process of the flowchart shown in FIG. 7 is started in regular cycles. In step S21, it is determined whether or not the battery 1 is being wirelessly charged.

When it is determined in step S21 that the battery 1 is not being charged, a No determination is made and the current process is ended.

On the other hand, when it is determined in step S21 that the battery 1 is being charged, a Yes determination is made and the process moves to step S22.

In step S22, it is determined whether or not an outside air temperature is equal to or lower than a predetermined temperature (e.g., a temperature at which freezing can occur).

When it is determined in step S22 that the outside air temperature is higher than the predetermined temperature, a No determination is made and the process moves to step S23. In step S23, the normal charging process is performed and then the current process is ended.

On the other hand, when it is determined in step S22 that the outside air temperature is equal to or lower than the predetermined temperature, a Yes determination is made and the process moves to step S24.

In step S24, it is determined whether or not the scheduled time of use Tx of the battery 1, i.e., a time at which the electrically powered vehicle is scheduled to be driven next time, can be ascertained or inferred. In the case of this embodiment, the scheduled time of use Tx can be ascertained or inferred by the above-described ascertaining method or inferring method.

Here, when it is determined in step S24 that the scheduled time of use Tx cannot be ascertained or inferred, a No determination is made, and the normal charging process is performed in step S23, and then the current process is ended.

On the other hand, when it is determined in step S24 that the scheduled time of use Tx can be ascertained or inferred, a Yes determination is made and the special charging process shown in steps S25 to S27 is performed.

First, in step S25, the early-stage charging process is performed. After the early-stage charging process ends, it is determined in step S26 whether or not the time to start the late-stage charging process has come.

Here, when it is determined in step S26 that the time to start the late-stage charging process has not yet come, a No determination is made and the process of step S26 is performed again.

On the other hand, when it is determined in step S26 that the time to start the late-stage charging process has come, a Yes determination is made, and the late-stage charging process is performed in step S27, and then the current process is ended.

This embodiment has effects and advantages similar to those of the above embodiment.

The disclosure is applicable to charging controllers that control a process of charging a battery installed, for example, in an electrically powered vehicle.

What is claimed is:

1. A charging controller that controls a process of charging a battery from an external power source, wherein when an outside air temperature is equal to or lower than a predetermined temperature, the charging controller is configured to:
   begin an early-stage charging process to charge the battery so as to reach a predetermined state-of-charge lower than a full state-of-charge;
   pause the early-state charging process once the state-of-charge of the battery reaches the predetermined state-of-charge; and
   when a time earlier than a scheduled time of use of the battery by a predetermined time until the scheduled time of use is reached, begin a late-stage charging process to charge the battery from the predetermined state-of-charge to the full state-of-charge.

2. The charging controller according to claim 1, wherein the charging controller is provided in an outlet cable having a charging connector that is removably connected to a charging inlet of the battery and a power plug that is removably connected to a power socket of the external power source.

* * * * *